(12) United States Patent
Yamatani

(10) Patent No.: US 8,430,194 B2
(45) Date of Patent: Apr. 30, 2013

(54) STRUCTURE FOR COOLING HEATING ELEMENT

(75) Inventor: Eiji Yamatani, Saitama-ken (JP)

(73) Assignee: Calsonic Kansei Corporation, Saitama-shi (JP)

( * ) Notice: Subject to any disclaimer, the term of this patent is extended or adjusted under 35 U.S.C. 154(b) by 243 days.

(21) Appl. No.: 13/044,929

(22) Filed: Mar. 10, 2011

(65) Prior Publication Data

US 2011/0226441 A1 Sep. 22, 2011

(30) Foreign Application Priority Data

Mar. 18, 2010 (JP) .................................. 2010-062979

(51) Int. Cl.
*B60K 11/06* (2006.01)
(52) U.S. Cl.
USPC .......................................... 180/68.1; 180/68.5
(58) Field of Classification Search ................. 180/68.1, 180/68.2, 68.5; 165/47, 48.1, 58, 59
See application file for complete search history.

(56) References Cited

U.S. PATENT DOCUMENTS

| 7,635,040 | B2* | 12/2009 | Seo et al. ..................... 180/68.1 |
| 7,905,307 | B2* | 3/2011 | Kubota et al. ................ 180/68.1 |
| 8,251,169 | B2* | 8/2012 | Fujiwara ...................... 180/68.1 |
| 8,276,696 | B2* | 10/2012 | Lucas .......................... 180/68.2 |
| 2009/0152031 | A1* | 6/2009 | Lim .............................. 180/68.1 |
| 2010/0099019 | A1* | 4/2010 | Nagata et al. ................. 429/120 |
| 2010/0294580 | A1* | 11/2010 | Kubota et al. ................ 180/68.1 |

FOREIGN PATENT DOCUMENTS

JP 07-132859 A 5/1995

* cited by examiner

*Primary Examiner* — John Walters
(74) *Attorney, Agent, or Firm* — Foley & Lardner LLP

(57) ABSTRACT

A structure for cooling a heat element includes a heat element box containing a heat element and forms an air passageway therebetween, an intake duct connecting a passenger compartment and the air passageway, a discharge duct connecting the air passageway and a vehicle exterior, and a wall on a vehicle body. The intake duct has a water reserving portion for accumulating a liquid entering from the passenger compartment. The intake duct has an expansion portion and has a discharge hole of the liquid. The wall is provided to face the discharge hole so that the liquid discharged through the discharge hole moves downward along a surface of the wall.

20 Claims, 4 Drawing Sheets

FRONT ←→ REAR

REAR ← → FRONT

STRUCTURE FOR COOLING HEATING ELEMENT

BACKGROUND OF THE INVENTION

1. Field of the Invention

The present invention relates to a structure for cooling a heat element such as a battery.

2. Description of the Related Art

A conventional structure for cooling a heat element of this kind is disclosed in Japanese Patent Application Laid-Open Publication N0. 07-132859.

This prior structure for cooling the heat element is applied to an electric vehicle for example to cool its battery. This structure has an air duct for supplying a battery mounted under a floor panel with the open air so as to cool the battery. The air duct is provided with a water reserving portion so as to trap water and splash entering from a vehicle exterior to prevent them from entering the battery.

However, in the above known conventional a structure for cooling a heat element, there are problems in that, although the water reserving portion of the air duct can accumulate the entering liquid such as water and splash and avoid its invasion to the battery, the liquid overflows and enter the battery when large volume of the liquid is inhaled into the air duct. This causes the battery to be damaged.

In addition, even when the liquid does not reach the maximum accumulation limit of the water reserving portion, the air inhaled into the air duct blows the liquid out of the water reserving portion toward the battery. This also causes the battery to be damaged.

It is, therefore, an object of the present invention to provide a structure for cooling a heat element which overcomes the foregoing drawbacks and can surely prevent the liquid from entering a heat element box.

SUMMARY OF THE INVENTION

According to a first aspect of the present invention there is provided a structure for cooling a heat element including a heat element box, an intake duct, a discharge duct and a wall. The heat element box contains a heat element and forms an air passageway between the heat element box and the heat element. The intake duct fluidically connects a passenger compartment and the air passageway with each other in such a way that air in the passenger compartment flows into the air passageway through the intake duct to cool the heat element. The intake duct is provided with a water reserving portion that can accumulate a liquid entering from the passenger compartment. The intake duct has an expansion portion that forms a portion of the water reserving portion, and the expansion portion is provided with a discharge hole of the liquid. The discharge duct fluidically connects the air passageway and a vehicle exterior to discharge the air in the heat element box to the vehicle exterior. The wall is provided on a vehicle body to face the discharge hole so that the liquid discharged through the discharge hole moves downward along a surface of the wall.

Therefore, the liquid entered the intake duct from the passenger compartment is surely brought into the water reserving portion of the intake duct, and then it is discharged through the discharge hole toward the wall, where the liquid falls down along the wall. This ensures the liquid to be prevented from entering the air passageway of the heat element box. Accordingly, the heat element can be prevented from damages due to the liquid.

Preferably, the intake duct and the heat element box are disposed in a heat element storage space that is formed between the passage compartment and a luggage compartment, and the wall defines the heat element storage space from the luggage compartment.

Therefore, the wall is used as a liquid guide passage and a partition plate. This can remove an additional discharge pipe and the like.

Preferably, a surface of the expansion portion, which is formed with the discharge hole, and the wall are slanted relative to each other in such a way that a clearance is formed between the discharge hole and the wall.

Therefore, this can prevent the discharge hole from being covered by the wall even when the expansion portion contacts with the wall.

Preferably, the expansion portion has a configuration shaped like one of a U-letter and a V-letter seen from a discharge hole side.

Therefore, this can direct the liquid discharged through the discharge hole to the wall.

Preferably, the intake duct is provided with a projecting portion that projects downward from a bottom surface of the intake duct to define a bottom surface of the expansion portion from a rest of the bottom surface of the intake duct.

Therefore, the discharged liquid on the bottom surface of the intake duct is separated from the projected portion to be forcibly fallen down near the wall. This ensures the liquid to be prevented from entering the heat element.

Preferably, the heat element is a battery.

Therefore, the battery can be cooled down without invasion of the liquid from the passenger compartment.

Preferably, a lower edge of the wall and a floor panel of a vehicle body form a space through which the liquid passes to an inner space formed by a spare wheel recess portion of the floor panel.

Therefore, the liquid fallen along the wall can be surely brought in the inner space formed by the spare wheel recess portion, which can prevent the liquid from being accumulated on a floor where the heat element is placed.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
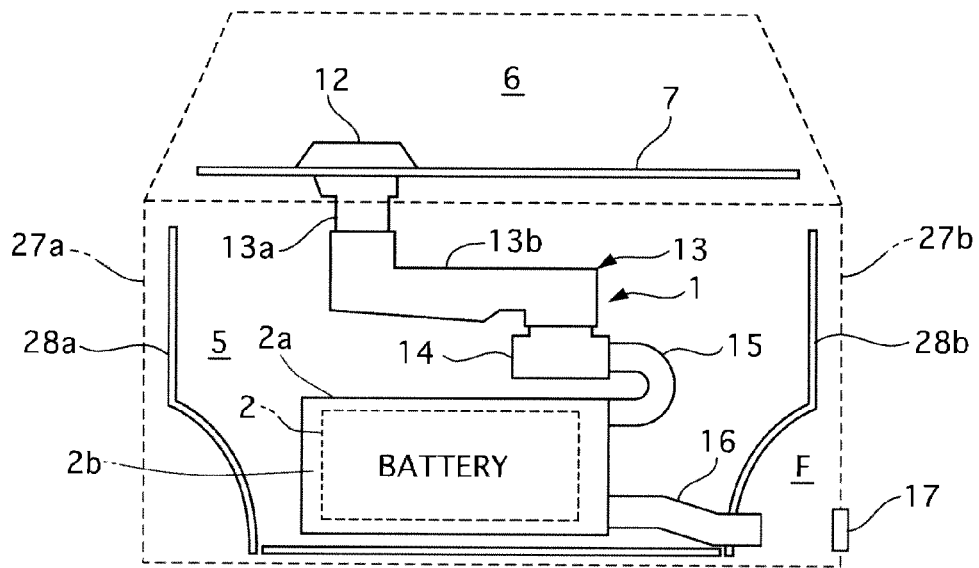
FIG. 1 is a rear view showing a structure for cooling a heat element, which is mounted on an electric vehicle, of a first embodiment according to the present invention.

Throughout the following detailed description, similar reference characters and numbers refer to similar elements in all figures of the drawings, and their descriptions are omitted for eliminating duplication.

In a first preferred embodiment according to the present invention, a structure for cooling a heating element is applied to an electric vehicle, and the heating element is a battery that is capable of supplying an electric motor and other electric devices with electric power.

Figure 2:
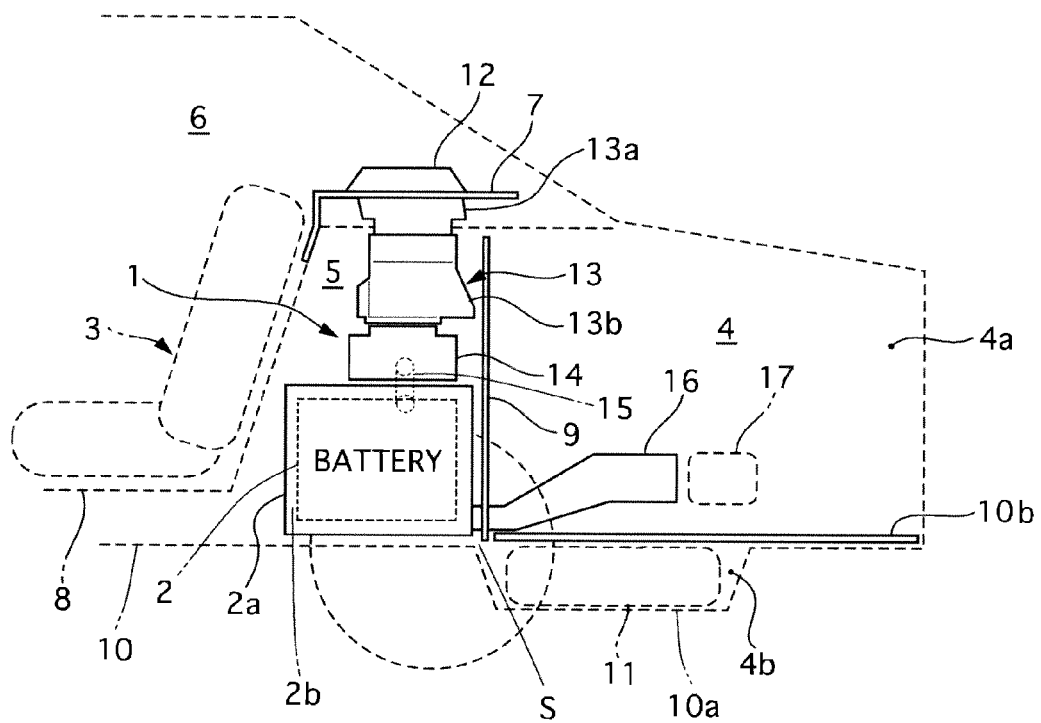
FIG. 2 is a side view showing the structure for cooling the heating element of the first embodiment.

Referring to FIG. 1 and FIG. 2 of the drawings, there is shown the first embodiment of the structure for cooling the heat element in a state where it is mounted on a rear portion of the electric vehicle.

The structure 1 for cooling the battery 2 is installed in a battery storage space 5 which is formed between a passenger compartment 6 and a rear luggage compartment 4.

An interior panel 8 and an interior trim 7 define the battery storage space 5 from the passenger compartment 6. The interior trim 7 is attached on a rear-side upper flat portion of the interior panel 8. The interior panel 8 has a bottom flat portion which is fixed on a floor panel 10, a diagonally standing portion which is fixed on side body panels 27a and 27b of a vehicle body to separate the passenger compartment 6 and the battery storage space 5, and a rear-side upper horizontal portion which covers the structure 1.

The floor panel 10 has a spare wheel recess portion 10a under the luggage compartment 4 so as to form a space 4b for receiving a spare wheel 11. The space 4b is covered by a floor board 10b except its front small area. The spare wheel recess portion 10a is provided with a not-shown drain port which is usually plugged. A rear seat 4 is fixed on the floor panel 10 at a front side of the interior trim 7.

A front-side trunk trim 9 stands vertically from the floor panel 10 to the rear-side upper horizontal portion of the interior panel 8 to define the battery storage space 5 from the luggage compartment 4. In other words, the battery storage space 5 is formed by the interior panel 8, the front-side trunk trim 9 and side trunk trims 28a and 28b. A lower edge portion of the front-side trunk trim 9 is positioned in such a way that a space S is formed so as to communicate the battery storage space 5 and the space 4b of the spare wheel recess portion 10a with each other between the front side of the front-side trunk trim 9 and the floor panel 10. The front-side trunk trim 9 corresponds to a wall of the present invention.

The battery storage space 5 contains the battery 2 and the structure 1 for cooling the battery 2.

The battery 2 is a battery module containing a plurality of laminated cells that is packed for example. The battery 2 is placed in a battery box 2a, being connected with a not-shown motor and also with not-shown other electrical devices. The battery storage space 5 corresponds to a heat element storage space of the present invention.

The battery box 2a is fixed on a floor panel 10 of a vehicle body, and it has clearances between inner surfaces thereof and outer surfaces of the battery 2 to form an air passageway 2b for cooling the battery 2 by the air flowing therethrough. Preferably, the air passageway 2b is provided along all surfaces of the battery 2, a front surface, side surfaces, top surface, bottom surface and rear surface thereof. The battery box 2a corresponds to a heat element box of the present invention.

The battery storage space 5 is fluidically connected with the passenger compartment 6 and a vehicle exterior through the structure 1 for cooling the battery 2 in such a way that the air in the passenger compartment 6 can flow into the battery box 2 to cool the battery 2 and be then discharged to the vehicle exterior.

In order to obtain such an above function, the structure 1 for cooling the battery 2 is constructed to have an inlet port part 12, a first intake duct 13, a blower 14, a second intake duct 15, a discharge duct 16 and a discharge port part 17 in addition to the air passageway 2b of the battery box 2a.

The inlet port part 12 is attached on a left side portion of the interior trim 7, and the inlet port part 12 is fluidically connected with a connecting duct 13a. An upper end portion of the connecting duct 13a is fixed on an under-side surface of the interior trim 7, and it extends in a vertically downward direction so that a lower end portion thereof is fluidically connected with an upper end portion, namely a left opening portion 18, of a main intake duct 13b.

The connecting duct 13a and the main intake duct 13b constitute the first intake duct 13. The main intake duct 13b is placed and extends in a latitude direction of the vehicle body as shown in FIG. 1. The detail structure of the main intake duct 13b will be later described.

The blower 14 has a fan that is driven by a not-shown electric motor. The blower 14 inhales the air existing in the passenger compartment 6 through the inlet port part 12, the connecting duct 13a and the main duct 13b, and belches the air out into the second intake duct 15, when the blower 14 is driven. The rotation speed of the blower 14 is controlled by a not-shown controller. For example, the rotation speed is increased as the temperature of the battery 2 becomes higher.

The second intake duct 15 fluidically connects the blower 14 and the battery box 2a to supply the air passageway 2b of the battery box 2a with the air sent from the blower 14.

The discharge duct 16 fluidically connects the air passageway 2b of the battery box 2a and an exterior of the side trunk trim 28b, namely a space F formed by the side body panel 27a and the side trunk trim 28a. Accordingly, the discharge duct 16 that penetrates the front-side trunk trim 9 is passes through the luggage compartment 4, then penetrating the side trunk trims 28a.

The discharge port part 17 is provided in the side body panel 27b to discharge the air in the space F to the exterior of the vehicle body.

The main intake duct 13b of the first intake duct 13 is constructed as shown in FIGS. 3 to 7.

Figure 3:
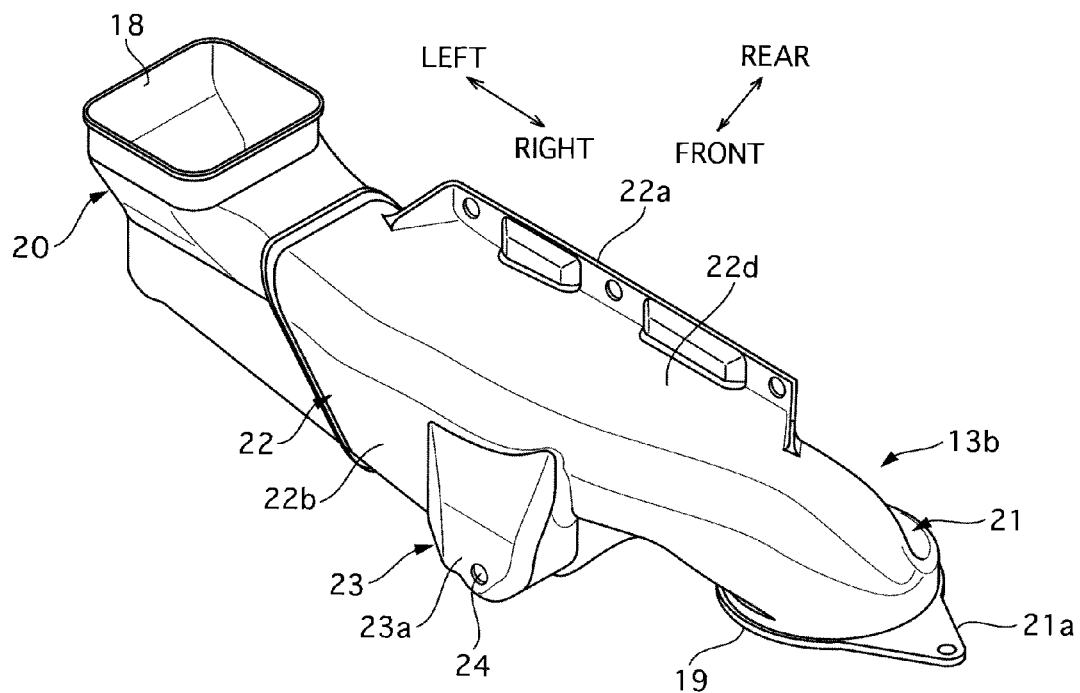
FIG. 3 is a perspective view showing an air intake duct which is used in the structure for cooling the heating element of the first embodiment.
Figure 4:
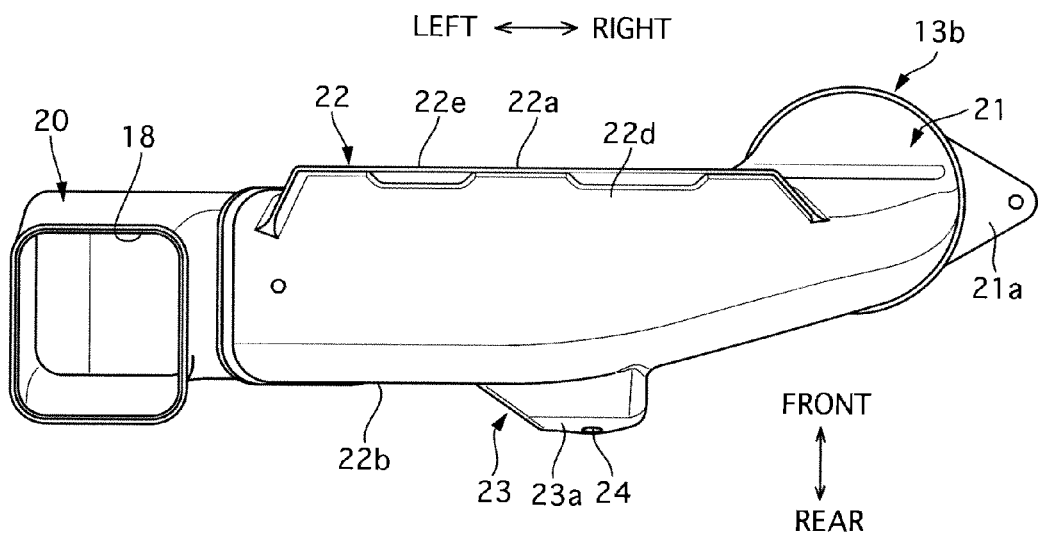
FIG. 4 is a top plain view showing the air intake duct shown in FIG. 3.
Figure 5:
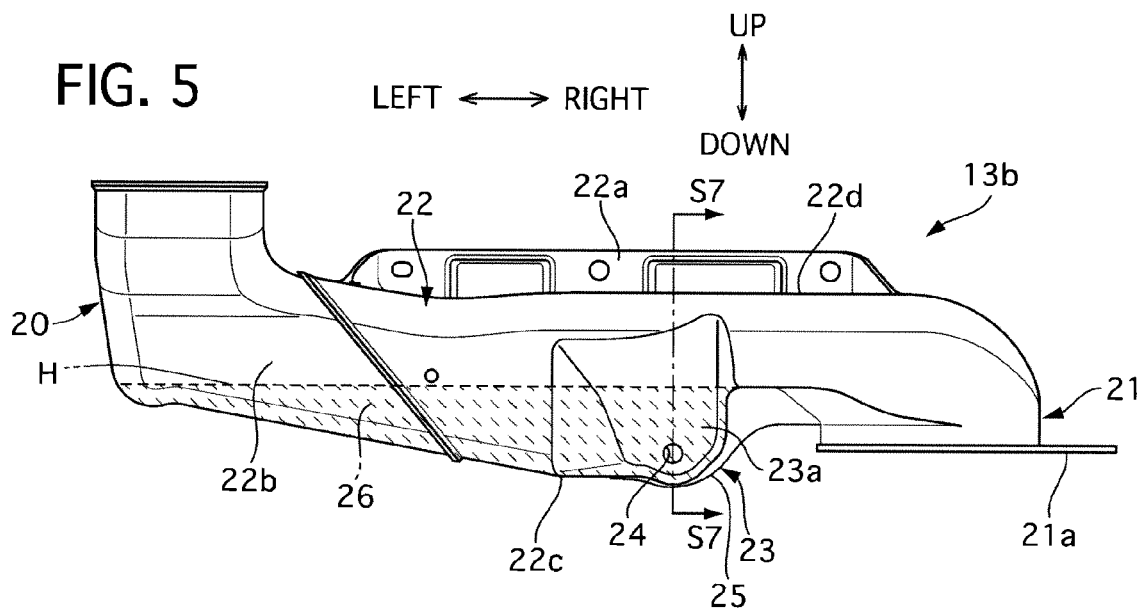
FIG. 5 is a rear view showing the air intake duct shown in FIG. 3.
Figure 6:
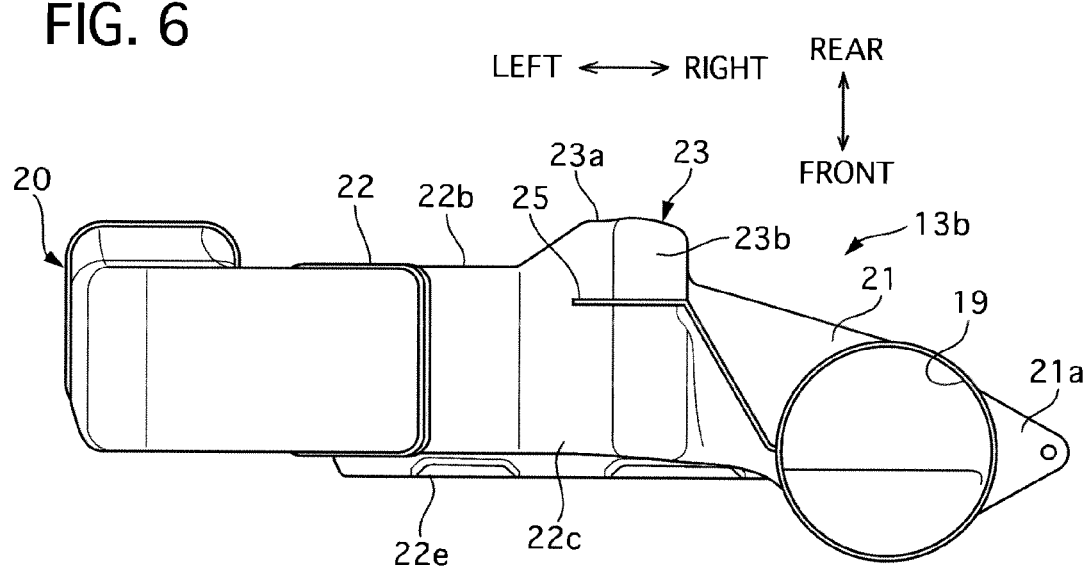
FIG. 6 is a bottom view showing the air intake duct shown in FIG. 3.
Figure 7:
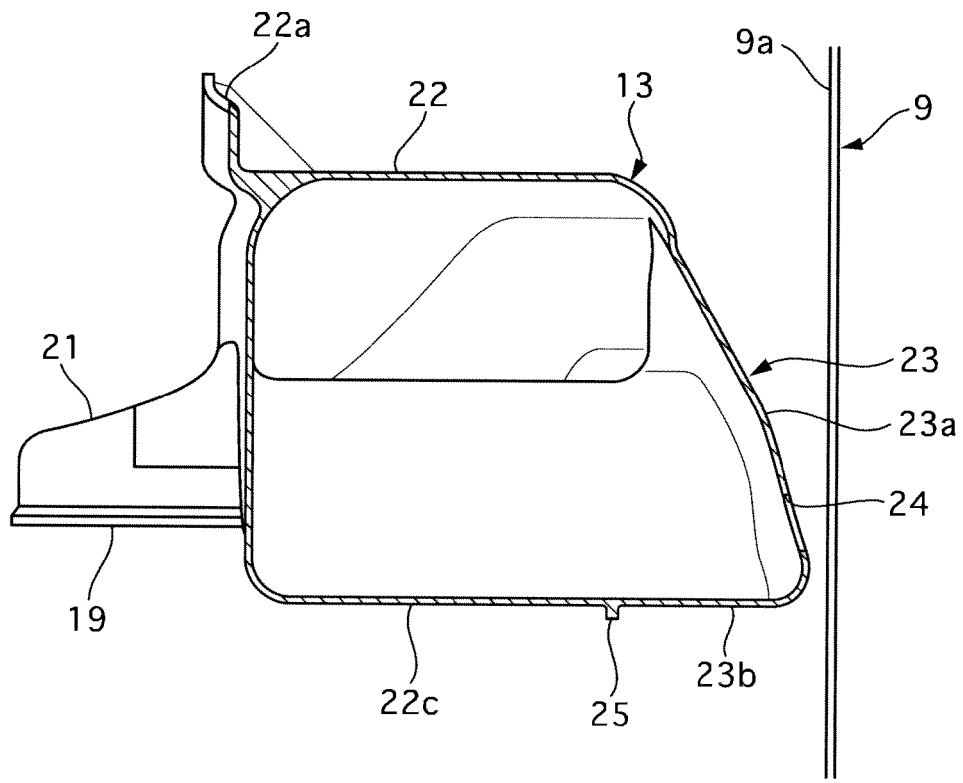
FIG. 7 is an enlarged cross sectional side view of the air intake duct shown in FIG. 3, taken along a line S7-S7 in FIG. 5.

FIG. 3 shows a perspective view of the main intake duct 3 which is seen from front side, FIG. 4 shows a top plain view of the main intake duct 13b, FIG. 5 shows a rear view of the main intake duct 13b, FIG. 6 shows a bottom view of the main intake duct 13b, and FIG. 7 shows an enlarged cross sectional side view of the main intake duct 13b.

In theses drawings, a left and right direction corresponding a lateral direction of the vehicle body, a front and rear direction corresponding to a longitudinal direction of the vehicle body and a vertical direction are indicated by arrows, respectively.

The connecting duct 13a and the main intake duct 13b of the first intake duct 13 are formed by using a blow molding method of thermoplastics resin.

The main intake duct 13b is formed as a tube that extends in the lateral direction of the vehicle body and has the left opening portion 18, and a right opening portion 19. A left end portion 20 of the main intake duct 13b is bent upward so that the left opening portion 18 is opened upwardly, while a right end portion 21 of the main intake duct 13b is bent downward so that the right opening portion 19 is opened downward. The left end portion 20 and the right end portion 21 are formed with an intermediate portion 22 as one unit.

The left opening portion 18 is formed to have a rectangular shape in its cross section and receive an outlet portion of the connecting duct 13a. The right opening portion 19 is formed to have a circular shape in its cross section and receive an intake portion of the blower 14.

The intermediate portion 22 of the main intake duct 13b is provided with a flange portion 22 on an upper surface 22d thereof at its front surface 22e side so as to be fixed to a not-shown bracket provided on the vehicle body by using not-shown clips.

The right end portion 21a of the main intake duct 13b is provided with a flange portion 21a so as to be fixed to the blower 14 by using a clip.

As shown in FIG. 5, the main intake duct 13b has an inner space that is formed by an inner wall of the main intake duct 13b so as to function as a water reserving portion 26. As shown in FIG. 5, oblique broken lines indicate water that can be accumulated at the highest level in the water reserving portion 26. "H" indicates the highest level of the water that can be accumulated in the water reserving portion 26. Accordingly, the water cannot overflow toward the right opening portion 19 unless the water level becomes higher than the highest level H.

The water reserving portion 26 becomes deeper toward the right-side end portion 21, and the deepest portion thereof is set at the left side of the right-side end portion 21. The right-side inner wall extends from the right side of the deepest portion to the highest water level H so as to define the water reserving portion 26 from the right-side opening portion 19.

The main intake duct 13b is further provided at the deepest portion with an expansion portion 23 that extends toward a front surface 9a of the front-side trunk trim 9. A clearance between the expansion portion 23 and the front surface 9a of the front-side trunk trim 9 is set to be as small as possible.

The expansion portion 23 is formed to have a rear surface shaped like a U-letter seen from the rear side. An inner space of the expansion portion 23 forms a portion of the water reserving portion 26.

A discharge hole 24 is provided at the lowest side position of a slanted surface 23a of the expansion portion 23 so as to face the front surface 9a of the front-side trunk trim 9. Specifically, the discharge hole 24 is positioned under the highest water level H, preferably in the deepest portion or this neighboring portion. The slanted surface 23a is slanted in such a way that the slanted surface 23a becomes nearer to the front surface 9a of the front-side trunk trim 9 as its portion becomes lower.

A projecting portion 25 is formed on a bottom portion 22c of the intermediate portion 22 at the rear end side of the intermediate portion 22 from the expansion portion 23 to the right-side opening portion 19 as shown in FIGS. 5-7. The projecting portion 25 projects downward from the bottom portion 22c of the intermediate portion 22 to define the bottom portion 22c and a bottom portion 23b of the expansion portion 23.

Next, the operation and advantages of the structure 1 for cooling battery 2 of the first embodiment will be described.

When the temperature of the battery 2 is low, the blower 14 is not driven. Therefore, the air existing in the passenger compartment 6 is not forcibly inhaled into the battery box 2a.

When the temperature of the battery 2 becomes high, the not-shown controller detects it based on a temperature signal outputted from a not-shown temperature sensor and outputs a drive signal to a not-shown power device of the blower 14. The blower rotates its fan at a rotation speed which varies according to the temperature of the battery 2.

The air existing air in the passenger compartment 6 is inhaled toward the connecting duct 13a through the inlet port part 12 and the main intake duct 13b of the first intake duct 13 toward the blower 14, and then it is blasted out toward the battery box 2a through the second intake duct 15.

The air outputted from the second intake duct 15 runs along the air passageway 2b formed between the inner wall of the battery box 2a and the outer surfaces of the battery 2, so that the battery 2 is cooled down by the air so as to avoid being overheated.

The air is outputted to the space F through the discharge duct 16 after it cools the battery 2, and then it is discharged to the vehicle exterior through the discharge port 17.

In this operation, the air in the passenger compartment 6 is used to cool the battery 2, and the temperature in the passenger compartment 6 is always maintained at temperature comfortable to passengers by a driver. Therefore, the air at preferred temperature is brought and cools the battery 2. Especially, when a temperature of the open air is higher than that in the passenger compartment 6 like in summer, the latter temperature is lower than the former temperature. This enables the battery 2 to be cooled more effectively. In addition, the air in the passenger compartment 6 does not basically include rain water, splash and the like, and accordingly they do not enter the battery 2.

However, a passenger at the rear seat may spill liquid such as water or drink on the interior trim 7 by mistake and the liquid may flow in the inlet port part 12.

In this case, the liquid drops to the main intake duct 13b through the connecting duct 13a, and it is captured in the water reserving portion 26 of the main induct duct 13b. The highest level H is set to be lower than the height of the most possible amount of the liquid that may be entered through the inlet port part 12.

The liquid entered in the water reserving portion 26 is discharged toward an exterior of the main intake duct 12 through the discharge hole 24 formed in the expansion portion 23, because the discharge hole 24 is formed at the lowest position or its neighboring position of the water reserving portion 26. Therefore, the liquid spilt by mistake does not enter the battery 2, so that the battery 2 can be prevented from damages due to them.

On the other hand, most of the liquid discharged through the discharge hole 24 is expelled toward the front surface 9a of the front-side trunk trim 9 and then drops downward along it as indicated by an arrow W in FIG. 9. Then, the liquid falls into the inner space of the spare wheel recess portion 10a through the space S.

Figure 8:
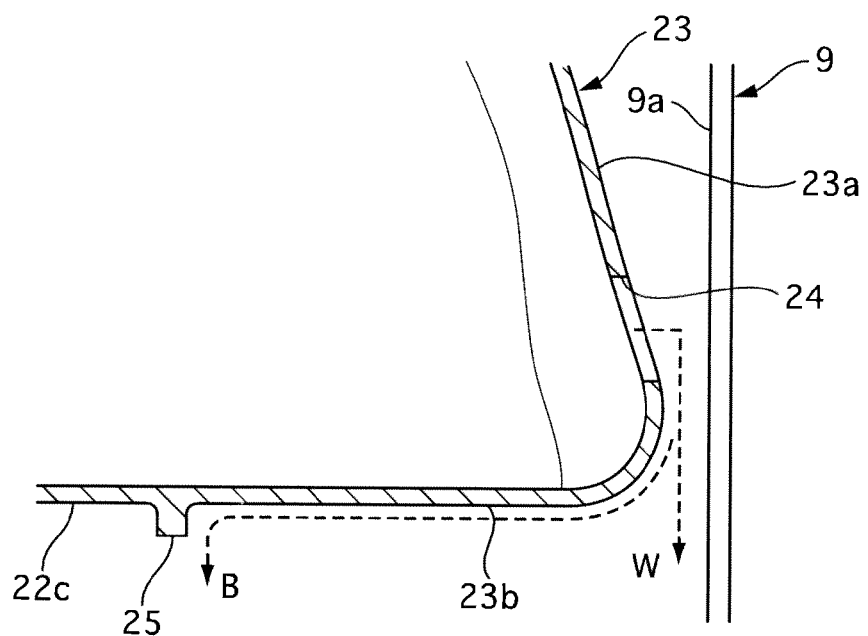
FIG. 8 is an enlarged cross sectional side view of a bottom portion of the air intake duct shown in FIG. 3.

The rest of the liquid moves to the projecting portion 25 along the outer surface of the bottom portion 23b of the expansion portion 23, and then the liquid is separated from the projecting portion 25 and drops down into the inner space of the spare wheel recess portion 10a through the space S as indicated by an arrow B in FIG. 8.

In order to use the front surface 9a of the front-side trunk trim 9 as a guide passage of the liquid discharged through the discharge hole 24, the discharge hole 24 must be disposed near the front surface 9a. In this case, the intake duct 13 is arranged at an intermediate position in the longitudinal direction of the vehicle body, so that the intake duct 13 is too far away from the front surface 9a of the front-side trunk trim 9. The expansion portion 23 extends rearward to have the discharge hole 24 at its most rear side, and accordingly the liquid discharged through the discharge hole 24 can reach the front surface 9a of the front-side trunk trim 9.

When the expansion portion 23 is set near the front-side trunk trim 9, they may be contacted with each other due to dimension errors, assembly errors and/or deflections of parts such as the intake duct 13 and the front-side trunk trim 9. In this case, as the discharge hole 24 is formed in the slanted surface 23a of the expansion portion 23 and the front-side trunk trim 9 stands vertically, the discharge hole 24 can be prevented from being covered by the front-side trunk trim 9. This ensures the liquid to be discharged through the discharge hole 24.

The liquid discharged through the discharge hole 24 falls along the front surface 9a of the front-side trunk trim 9, which can remove additional discharging pipe or the like. In addition, the distance between the discharge hole 24 of the intake duct 13 and the front-side trunk trim 9 is shorter than that between the discharge hole 24 and the side trunk trims 28a and 28b because of the existence in the wheel house portions at both side of the battery 2. Accordingly, it is more advantageous to form the liquid guide passage on the front-side trunk trim 9 than on the side trunk trims 28a and 28b.

Further, it is more advantageous to form the liquid guide passage on the front-side trunk trim 9 than on the diagonally standing portion of the interior trim 7, because the liquid discharged through the discharge hole 24 accumulates in the battery storage space 5.

The configuration, which is seen from the discharge hole side, of the expansion portion 23 is formed like the U-letter, and the discharge hole 24 is provided at the most rear end portion of the expansion portion 23 and at its substantially lowest position. This can prevent the liquid from being scattered in the longitudinal direction of the vehicle body by directing the liquid discharged through the discharge hole 24 to a narrow area on the front surface 9a of the front-side trunk trim 9.

The projecting portion 25 forcibly separates the liquid on the bottom surface 23b from the projecting portion 25 to fall down near the front-side trunk trim 9. Thus the projecting portion 25 prevents the liquid from moving in the longitudinal direction of the vehicle body along the bottom surfaces 23b and 23c of the intake duct 13.

While there have been particularly shown and described with reference to preferred embodiments thereof, it will be understood that various modifications may be made therein, and it is intended to cover in the appended claims all such modifications as fall within the true spirit and scope of the invention.

For example, the surface 23 with the discharge hole 24 is slanted and the front-side trunk trim 9 vertically stands in the above embodiment, but one of or both of the surface 23 and the front-side trunk trim 9 may be slanted and their slant directions may be set appropriately.

The configuration, which is seen from the discharge hole side, of the expansion portion 23 is shaped like the U-letter, but it may be shaped like a V-letter.

The projecting portion 25 may be positioned at a vehicle-rear side of a rear end portion of the battery 2. This can avoid water dropped from the projecting portion 25 from directly adhering on the battery box 2a.

The heat element is a battery in the above embodiment, and it may be other devices such as an inverter.

The entire contents of Japanese Patent Application No. 2010-062979 filed Mar. 18, 2010, 200 are incorporated herein by reference.

What is claimed is:
1. A structure for cooling a heat element comprising:
a heat element box that contains a heat element and forms an air passageway between the heat element box and the heat element;
an intake duct that fluidically connects a passenger compartment and the air passageway with each other in such a way that air in the passenger compartment flows into the air passageway through the intake duct to cool the heat element, the intake duct being provided with a water reserving portion that can accumulate a liquid entering from the passenger compartment, the intake duct having an expansion portion that forms a portion of the water reserving portion, and the expansion portion being provided with a discharge hole of the liquid;
a discharge duct that fluidically connects the air passageway and a vehicle exterior to discharge the air in the heat element box to the vehicle exterior, and
a wall that is provided on a vehicle body to face the discharge hole so that the liquid discharged through the discharge hole moves downward along a surface of the wall.

2. The structure for cooling a heat element according to claim 1, wherein
the intake duct and the heat element box are disposed in a heat element storage space that is formed between the passage compartment and a luggage compartment, and wherein
the wall defines the heat element storage space from the luggage compartment.

3. The structure according to claim 2, wherein
a surface of the expansion portion, which is formed with the discharge hole, and the wall are slanted relative to each other in such a way that a clearance is formed between the discharge hole and the wall.

4. The structure according to claim 3, wherein
the expansion portion has a configuration shaped like one of a U-letter and a V-letter seen from a discharge hole side.

5. The structure according to claim 4, wherein
the intake duct is provided with a projecting portion that projects downward from a bottom surface of the intake duct to define a bottom surface of the expansion portion from a rest of the bottom surface of the intake duct.

6. The structure according to claim 5, wherein
the heat element is a battery.

7. The structure according to claim 6, wherein
a lower edge of the wall and a floor panel of a vehicle body form a space through which the liquid passes to an inner space formed by a spare wheel recess portion of the floor panel.

8. The structure according to claim 1, wherein
a surface of the expansion portion, which is formed with the discharge hole, and the wall are slanted relative to each other in such a way that a clearance is formed between the discharge hole and the wall.

9. The structure according to claim 8, wherein
the expansion portion has a configuration shaped like one of a U-letter and a V-letter seen from a discharge hole side.

10. The structure according to claim 9, wherein
the intake duct is provided with a projecting portion that projects downward from a bottom surface of the intake duct to define a bottom surface of the expansion portion from a rest of the bottom surface of the intake duct.

11. The structure according to claim 10, wherein
the heat element is a battery.

12. The structure according to claim 11, wherein
a lower edge of the wall and a floor panel of a vehicle body form a space through which the liquid passes to an inner space formed by a spare wheel recess portion of the floor panel.

13. The structure according to claim 1, wherein
the expansion portion has a configuration shaped like one of a U-letter and a V-letter seen from a discharge hole side.

14. The structure according to claim 13, wherein
the intake duct is provided with a projecting portion that projects downward from a bottom surface of the intake duct to define a bottom surface of the expansion portion from a rest of the bottom surface of the intake duct.

15. The structure according to claim 14, wherein
the heat element is a battery.

16. The structure according to claim 1, wherein
the intake duct is provided with a projecting portion that projects downward from a bottom surface of the intake duct to define a bottom surface of the expansion portion from a rest of the bottom surface of the intake duct.

17. The structure according to claim 16, wherein
the heat element is a battery.

18. The structure according to claim 17, wherein
a lower edge of the wall and a floor panel of a vehicle body form a space through which the liquid passes to an inner space formed by a spare wheel recess portion of the floor panel.

19. The structure according to claim 1, wherein
the heat element is a battery.

20. The structure according to claim 1, wherein
a lower edge of the wall and a floor panel of a vehicle body form a space through which the liquid passes to an inner space formed by a spare wheel recess portion of the floor panel.

* * * * *